MULTIPHASE SHIFT REGISTER MEMORY

Filed Nov. 13, 1963 3 Sheets-Sheet 1

INVENTOR.
RICHARD L. SNYDER,
BY
Walter J. Adam
ATTORNEY.

INVENTOR.
RICHARD L. SNYDER,
BY Walter J. Adam
ATTORNEY.

INVENTOR.
RICHARD L. SNYDER,
BY
Walter J. Adam
ATTORNEY.

3,387,290
Patented June 4, 1968

3,387,290

MULTIPHASE SHIFT REGISTER MEMORY

Richard L. Snyder, Fullerton, Calif., assignor to Hughes Aircraft Company, Culver City, Calif., a corporation of Delaware Filed Nov. 13, 1963, Ser. No. 323,292
11 Claims. (Cl. 340—174)

ABSTRACT OF THE DISCLOSURE

A magnetic shift register including a plurality of magntic mediums which are magnetically coupled to a polyphase propagating array formed of magnetic material and having a plurality of interconnected segments arranged in parallel juxtaposition which array is responsive to driving pulses applied thereto for developing sequences of driving fields. Recording coils arranged in staggered surrounding relationship at first ends of the magnetic mediums serve to develop informational magnetic domains in different ones of the magnetic mediums during different driving pulse intervals, reproducing coils arranged in staggered surrounding relationship at second ends of the magnetic medium serving to sense the informational magnetic domain.

This invention relates to magnetic memory systems and particularly to a shift register memory capable of operating at relatively high speeds.

In magnetic shift registers such as disclosed in Patent No. 2,919,432, "Magnetic Devices," by K. D. Broadbent, a magnetic medium is positioned adjacent to a two phase conductor driving array which responds to two phase driving pulses to periodically develop sequences of magnetic driving or propagating fields having quadrature phase or position relations, that is, develops a sequence of fields of opposite magnetic polarities repetitively progressing through cycles of four positions relative to the conductors. Selected sequences of magnetic states or domains are established by a recording coil at one end of the medium and the magnetic driving fiields propagate the domains to a reproducing coil arrangement at the other end of the medium. The magnetic driving fields have an intensity sufficient to move the domain walls along the medium, that is, to move the regions between adjacent domains, but insufficient to establish domain walls in the medium. In order to distinguish between a plurality of informational domains recorded along the medium, informational domains of a selected first or second magnetic polarity and reference domains of a constant first polarity are alternately established by the recording coil. Because of the configuration of the driving array in which the developed driving fields each have a similar magnetic polarity at positions of two of the adjacent driving conductors and are periodically shifted to sequentially progressing positions along the magnetic medium, two propagating time periods must be provided for the recording of each informational domain and each reference domain, during which time periods the other domain may not be recorded. In order to record this pattern of domains while utilizing the quadrature related driving fields, a cycle of four time periods corresponding to four different combinations of driving pulses are required to record a binary bit as well as to read a recorded bit. Thus, when utilizing a two phase propagating arrangement which has the minimum number of driving pulse combinations conventionally known to provide sequential propagation the speed operation is substantially limited by the time that must be allowed to establish the magnetic propagating fields. The operating speed may be increased by utilizing relatively short magnetic domains but the length of the domains is limited to a minimum value because of domain stability problems. For some uses it may be desirable to operate shift register memory systems at higher speeds than are allowed when four substantial time periods are required to record and retrieve each binary bit of information.

It is therefore an object of this invention to provide a shift register system that operates at relatively high speeds.

It is another object of this invention to provide a shift register memory system in which four binary bits of information are recorded and reproduced in each cycle of a quadrature related propagating field.

It is still another object of this invention to provide a shift register memory system having a minimum amount of associated circuitry.

It is a further object of this invention to provide a high speed shift register memory that is subject to relatively low cost production.

In accordance with the principles of the invention, a shift register system has a plurality of magnetic mediums positioned adjacent to a polyphase propagating array to respond to polyphase driving pulses applied to the array during each of a plurality of propagating time intervals. Recording coils coupled to the magnetic mediums are staggered in position along the conductor array so that magnetic states recorded at each propagating time interval in sequentially different channels are translated along the magnetic mediums in common positions relative to the conductor array. Reproducing coils coupled to the magnetic mediums are staggered in position with an opposite relation between the channels from that provided by the recording coils so that the recorded information is reproduced in the same order as it was recorded. Thus, a binary bit of information may be both recorded and reproduced during each propagating time interval as defined by the driving pulses. In one arrangement in accordance with the invention, the system may utilize single input amplifier circuits and single output amplifier circuits.

The novel features of this invention, as well as the invention itself, both as to its organization and method of operation, will best be understood from the accompanying descriptoin, taken in connection with the accompanying drawings, in which like reference characters refer to like parts, and in which.

Figure 1:
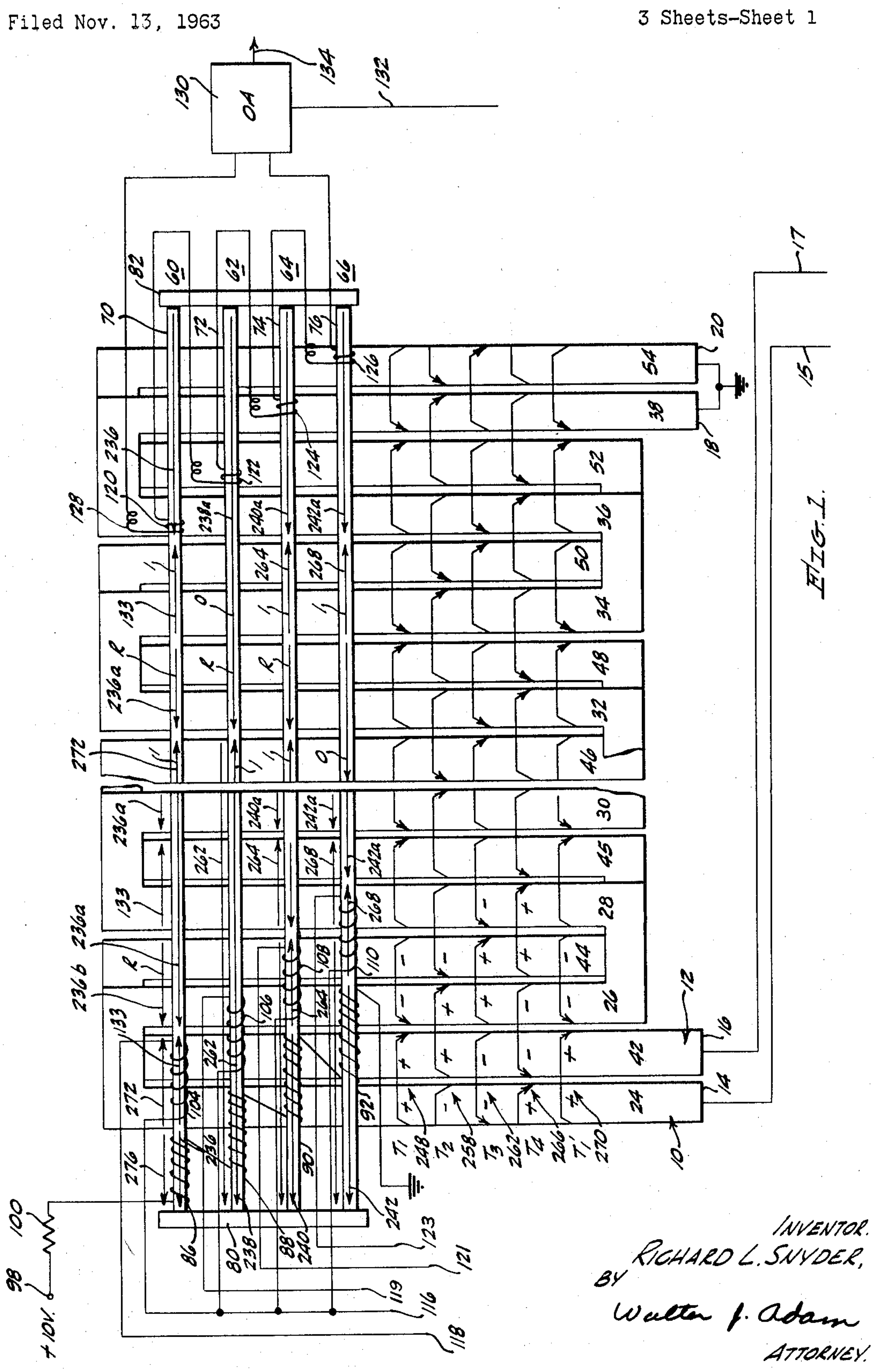
FIGURE 1 is a schematic circuit and block diagram showing the high speed shift register memory system in accordance with the principles of the invention.

Referring first to FIG. 1, the shift register system in accordance with the principles of the invention includes two phase propagating conductors 10 and 12 arranged so that segments thereof have alternate leading and trailing positions from ends 14 and 16 to respective ends 18 and 20. For example, the conductor 10 has segments 24, 26, 28, 30, 32, 34, 36 and 38, and the conductor 12 has segments 42, 44, 45, 46, 48, 50, 52 and 54. The conductors 10 and 12 may be formed from etched plates of a suitable material such as copper or aluminum. It is to be noted that other suitable propagating conductor arrangements such as insulated wires or deposited conductive material may be utilized in accordance with the principles of the invention. The ends 14 and 16 of the conductors 10 and 12 may be coupled to respective conducting leads 15 and 17 for responding to two phase propagating pulses and the opposite ends 18 and 20 may be coupled to a suitable source of reference potential such as ground.

Positioned adjacent to the propagating conductors 10 and 12 and substantially at right angles thereto are storage channels 60, 62, 64 and 66 respectively including magnetic wires 70, 72, 74 and 76 which may, for example, be formed from magnetic materials of a suitable iron-nickel combination. The wires 70, 72, 74 and 76 may be magnetically oriented along the longitudinal axis thereof, that is the magnetic dipoles or elements have a preferred direction of alignment along the longitudinal axis. The magnetic orientation may be provided by maintaining the wires under a stress condition such as axial tension, torsion or axial compression. The stress may in some arrangements be substantially near the yield point of the material, but the invention is not limited to any particular stress condition. For some magnetic materials such as thin films, longitudinal orientation for operation of the system in accordance with the invention is provided without a stress condition so that the principles of the invention are applicable to any magnetic material being sufficiently oriented to provide satisfactory operation. An oriented magnetic medium has the property that substantially more magnetomotive force must be applied thereto to establish a magnetic domain in the direction of orientation than is required to propagate in the direction of orientation an established domain wall or the joining of two opposite magnetic poles. The wires 70, 72, 74 and 76 may be maintained under tension by suitable maintaining structures 80 and 82.

The system in accordance with the invention stores information by alternately recording, in the direction of magnetic orientation, a reference domain of a first polarity and an informational domain selectively of the first or of a second polarity. The reference domains are established by reference coils or conductors 86, 88, 90 and 92 would around or magnetically coupled to respective wires 70, 72, 74 and 76 at positions that are respectively offset or staggered the width of one segment of the conductors 10 and 12 in the forward direction or to the right in FIG. 1. The reference coils 86, 88, 90 and 92, which may have a width substantially equal to the width of two conductor segments, are coupled in series from a suitable source of potential such as a +10 volt terminal 98 through a resistor 100 to ground so that in response to a constant DC current, reference magnetic states or domains are continuously established. For recording or writing binary information, recording coils or conductors such as 104, 106, 108 and 110 are wound around or magnetically coupled to the respective wires 70, 72, 74 and 76 in respectively offset or staggered positions forward or to the right of the corresponding reference coils. The recording coils 104, 106, 108 and 110 are respectively positioned over the conductor segments 24 and 42, segments 42 and 26, segments 26 and 44 and segments 44 and 28. The recording coils 104, 106, 108 and 110 are coupled at a first end to a digit lead 116 and respectively at the other ends to selection leads 118, 119, 121 and 123.

At the reproducing ends of the channels 60, 62, 64 and 66, reproducing or reading coils or conductors 120, 122, 124 and 126 are wound around or magnetically coupled to the respective wires 70, 72, 74 and 76. The reading coils 120, 122, 124 and 126 are positioned in an offset or staggered relation opposite from that of the recording coils to be respectively adjacent to conductor segments 36, 52, 38 and 54. A cancelling coil such as 128 may be coupled in series with each reading coil such as 120 of an opposite winding polarity to provide cancellation of signals induced by the propagating fields which are developed by the propagating conductors 10 and 12. The reading coils 120, 122, 124 and 126 and associated cancelling coils are coupled in series and to an output amplifier circuit 130 which in turn may respond to a strobe signal on a lead 132 to apply sensed signals to an output lead 134.

If the single output amplifier 130 is utilized, the signals sensed by the reading coils such as 124 may be cancelled by the trailing edge of magnetic domains such as 133 passing under the reading coil 120 as will be explained in further detail subsequently. Also, the signals sensed by the reading coil 126 may be cancelled by the trailing edge of a domain passing under the reading coil 122. In order to overcome this condition, the reading coils 120 and 122 are positioned near the left hand or first edges of the respective segments 36 and 52 and the reading coils 124 and 126 are positioned near the right hand or second edges of the respective segments 38 and 54.

Figure 2:
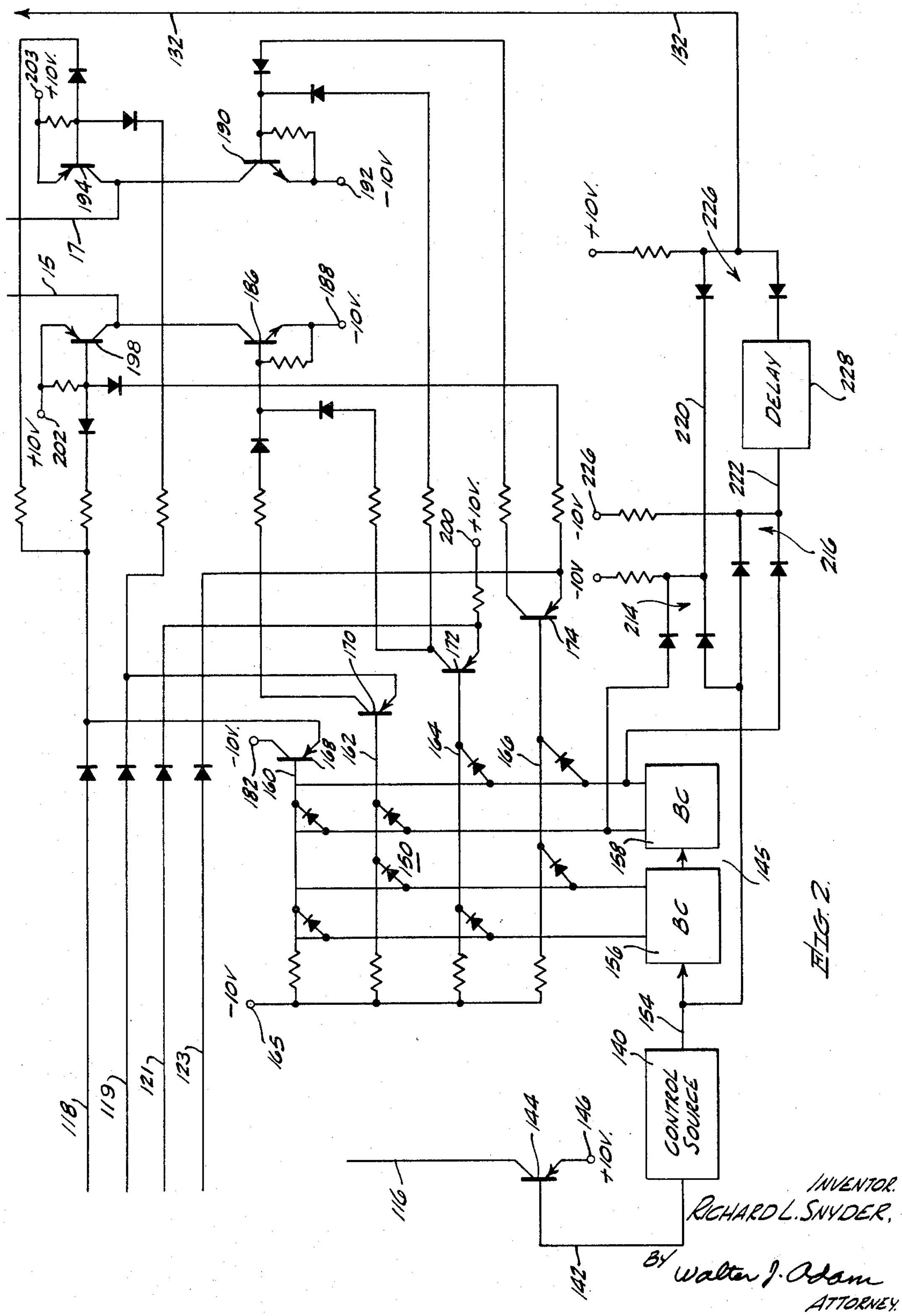
FIG. 2 is a schematic circuit and block diagram showing a control system that may be utilized with the system of FIG. 1.

Referring now principally to FIG. 2, a driving and control arrangement in accordance with the principles of this invention will be explained before further describing the operation of the system of FIG. 1. A control source 140 which may include the control logic of a digital computer, applies binary information signals of a waveform 151 (FIG. 3) through a lead 142 to the base of a pnp type amplifying transistor 144 having an emitter coupled to a suitable source of potential such a +10 volt terminal 146 and a collector coupled to the digit lead 116. For recording a binary "one," a negative pulse applied to the lead 142 may bias the transistor 144 into conduction and for recording a binary "zero" a positive signal level may maintain the transistor 144 in a nonconductive state. For selection of one of the recording coils 104, 106, 108 or 110 of FIG. 1, a current path is provided from one of the respective selection leads 118, 119, 121 or 123 to a negative potential as determined by the state of a binary counter 145 and a controlled selection gate 150. The control source 140 applies a clock or an advance pulse of a waveform 155 (FIG. 3) through a lead 154 to a first counter stage 156 which in turn is coupled to a second counter stage 158, both included in the binary counter 145. The counter stages 156 and 158 which include bistable flip flops having two output terminals to which alternate high and low level voltages are applied, change states in response to the input pulses, with the counter stage 158 changing state only in response to the condition that a low level pulse is applied to the right hand output terminal of the stage 156. Thus, the counter stage 156 must change state twice to change the state of the counter stage 158. The selection gate 150 is a conventional arrangement that includes diodes coupled between the output terminals of the counter stages 156 and 158 and leads 160, 162, 164 and 166 which in turn are coupled to a suitable source of potential such as a −10 volt terminal 165 and to the bases of respective pnp type transistors 168, 170, 172 and 174. As the binary states of the counter stages 156 and 158 change, the −10 volt potential from the terminal 165 is sequentially applied to different leads 160, 162, 164 and 166 to bias the corresponding transistors into conduction. The emitters of the transistors 168, 170, 172 and 174 are coupled to respective selection leads 118, 119, 121 and 123 through the cathode to anode paths of suitable diodes. The collector of the transistor 168 is coupled to a suitable source of potential such as a −10 volt terminal 182, the collector of the transistor 170 is coupled through the base to emitter path of an npn type transistor 186 to a −10 volt terminal 188 and the collector of the transistor 172 is coupled both to the base of the transistor 186 and through the base to emitter path of an npn type transistor 190 to a −10 volt terminal 192. The collector of the transistor 174 is coupled to the base of the transistor 190. The emitter of the transistor 168 is also coupled to the bases of pnp type transistors 194 and 198 and the emitter of the transistor 170 is coupled to the base of the transistor 194. The emitter of the transistor 172 is coupled to a suitable positive source of potential such as a +10 volt terminal 200. The emitter of the transistor 174 is coupled to the base of the transistor 198.

The transistor 198 has an emitter coupled to a suitable positive source of potential such as a +10 volt terminal 202 and a collector coupled to the collector of the transistor 186 as well as to the driving lead 15 and the transistor 194 has an emitter coupled to a suitable positive source of potential such as a +10 volt terminal 203 and a collector coupled to the collector of the transistor 190 as well as to the driving lead 17. Diodes and resistors are appropriately provided in the leads between the transistors 168, 170, 172 and 174 and the transistors 198, 186, 194 and 192.

In operation, when the transistor 168 is conducting at a first time period, the transistors 198 and 194 are biased into conduction and positive propagating pulses are applied to the leads 15 and 17. When the transistor 170 is conducting at a second time period, the transistors 186 and 194 are biased into conduction and negative and positive pulses are respectively applied to the leads 15 and 17. In a similar manner when the transistor 172 is conducting at a third time period, the transistors 186 and 190 are biased into conduction to apply negative driving pulses to the leads 15 and 17. At a fourth time period when the transistor 174 is conducting, the transistors 198 and 190 are biased into conduction and positive and negative driving pulses are applied to respective leads 15 and 17. This sequence of driving pulses then repeats in response to the repetitive change of states of the counter 145.

In order to apply properly timed strobe pulses to the lead 132 and to the output amplifier 130, first and second "and" gates 214 and 216 are provided, each having a diode coupled to the lead 154 and a diode coupled to opposite output terminals of the counter stage 158. Because the second counter stage 158 changes state after every two advance or clock pulses applied to the lead 154, a negative pulse is applied through the "and" gate 214 to a lead 220 for two time periods and a negative pulse is applied from the "and" gate 216 to a lead 222 for the next two time periods. The lead 220 is coupled directly to an "or" gate 226 and the lead 222 is coupled through a delay arrangement such as a delay line 228 to the "or" gate 226. Negative pulses are applied from the "or" gate 226 to the output amplifier 130. As will be explained subsequently, the delayed pulses allow strobing of the output sense amplifier 130 to provide reliable operation while utilizing a common amplifier arrangement.

Figure 3:
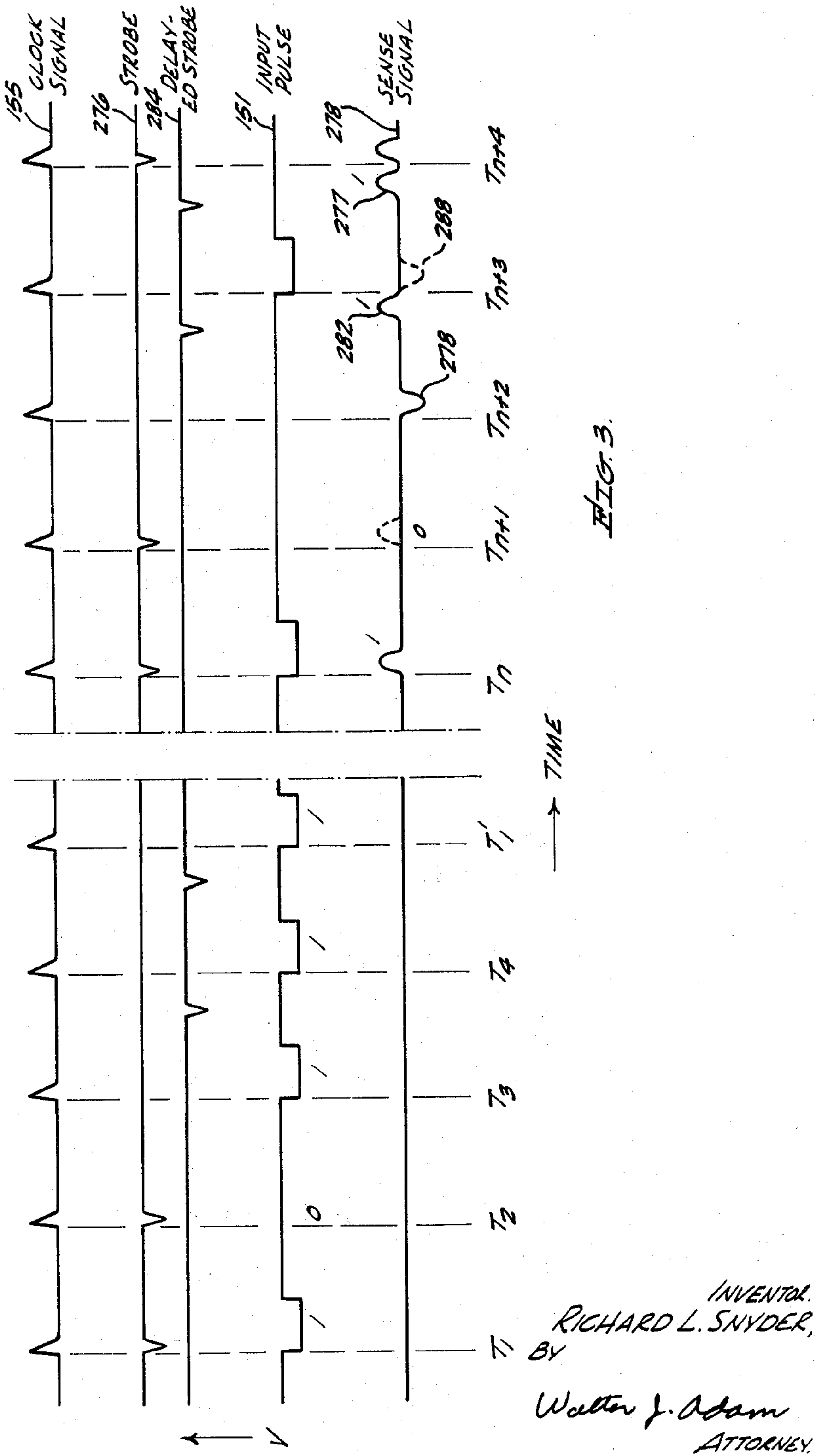
FIG. 3 is a schematic diagram of waveforms showing voltage as a function of time for further explaining the operation of the system of FIG. 1.

Referring now to FIGS. 1 and 2 and to the waveforms of FIG. 3, the operation of the high speed memory system will be explained in further detail. To clarify the explanation of operation, the system is first cleared of any residual information prior to normal operation. It is to be understood that in actual operation a new storage record may be started without regard to previously recorded information. In order to establish the magnetic wires 70, 72, 74 and 76 in a first reference state or clear state, reference domains of arrows 236, 238, 240 and 242, which are developed by the reference coils 86, 88, 90 and 92 are propagated, without recording binary informational domains, to the ends of the wires at the read coils. During a first time period which may be considered after time $T_1$ for the purposes of this clearing operation, the tail of the arrow 238 is propagated to the right over the segment 42 and the tail of the arrow 242 is propagated over the segment 44 in response to the propagating fields shown by field arrows 248. The clearing operation is explained by assuming that a domain wall of two opposite magnetic poles is to the right of the reference domain arrows such as 236 and 238, which domain walls are propagated to the ends of the magnetic wirs. At time $T_2$, in response to the propagating fields shown by field arrows 258, the domain of the arrow 236 is propagated over the segment 24, the domain of the arrow 238 is propagated over the segment 26, the domain of the arrow 240 is propagated over the segment 26 and the domain of the arrow 242 is propagated over the segment 28. This clearing operation continues in a similar manner in response to driving fields of field arrows 262 and 266 with the four time sequence repeating until all of the tails of the domain arrows 236, 238, 240 and 242 (if a domain wall is thereat) extend to the right ends of the wires 70, 72, 74 and 76. It is to be understood that this clearing action prior to normal operation may be performed by a proper oriented permanent magnet or electromagnet positioned adjacent to the magnetic wires, if desired.

After the memory system is cleared so that all of the wires throughout the length thereof are magnetized in the reference direction of the arrows 236, 238, 240 and 242, the normal writing and reading operation may be performed. At the time $T_1$, which time periods will now be considered to be during the normal operation, the clock signal of the waveform 155 is applied from the control source 140 to the binary counter 145 and positive pulses (not shown) are applied to both of the conductors 10 and 12 to develop the propagating fields having polarity relations shown by the line of field arrows 248. The + and — signs shown adjacent to the field arrows such as 248 respectively indicate positive and negative driving pulses. Also at time $T_1$, a digit input pulse of the waveform 151 is applied from the control source 140 to the base of the amplifier transistor 144, the negative pulse representing a binary "one" to be stored in the selected magnetic wire. Because at time $T_1$ the counter 145 selects the lead 118 by applying —10 volts thereto, the amplifier transistor 144 which is biased into conduction in response to the digit pulse, passes a current pulse only through the recording coil 104. Thus a binary "one" domain of the arrow 133 is established in the wire 70 of an opposite direction or polarity from the reference domain of the arrow 236. Because of the ++ polarity relation of the propagating fields developed by the segments 24 and 42, the magnetic domain of the arrow 133 does not move during the time period following time $T_1$. The shortened domain in the reference direction and to the right of the segment 42 to the right hand end of the wire 70 may be designated by the arrow **236*a*. The system is arranged so that the two ++ propagating field conditions such as at time $T_1$ are adjacent to the recording coil that may be energized (if a "one" is to be recorded) during that time period. It is to be noted that although in the arrangement shown, the recording coils such as 104 extend along two adjacent propagating segments, they may extend along only one segment such as the coil 104 being adjacent to only the segment 24, in which arrangement the domain such as shown by the arrow 133 propagates at time $T_1$, after being established, to the position shown in response to the propagating field. The propagation or translation operation is such that a domain wall between the heads of the arrows 133 and 236*a* stably rests between segments 42 and 26 shortly after the time $T_1$. It is to be noted that the reference domain of the arrow 236 adjacent to the reference coil 86 is maintained in the reference state. Because at this time the total length of the other magnetic wires 72, 74 and 76 are in the reference state, the arrows 238, 240 and 242** are not affected by the propagating fields because of the absence of domain walls.

At time $T_2$, in response to the clock pulse of the waveform 155, negative and positive pulses are applied to the respective conductors 10 and 12 to form the propagating fields in the conductor segments as shown by the field arrows 258. Also at time $T_2$, the selection lead 119 is energized by a —10 volt signal being applied thereto in response to the selection circuit 150. If a binary "zero" is to be recorded at time $T_2$, a pulse is not applied to the base of the amplifier transistor 144 as shown by the waveform 151, Because the transistor 144 remains in a nonconductive state, current is not passed through the selected recording coil 106 at time $T_2$ and the magnetic wire 72 remains in the "zero" state of the same polarity as the domain of the arrow 238, that is, a magnetic continuation thereof because a domain wall between opposite magnetic poles is not established. Also at time $T_2$, the magnetic domain of the arrow 133 is propagated one segment width forward so that the domain wall at the head of the arrow 133 is at the right of the segment 26 and the domain wall at the tail of the arrow 236 is propagated one segment width forward to be to the right of the segment 24. Thus, the reference domain established by coil 86 and designated by the arrow 236 is effectively translated one segment width forward lengthening the reference domain.

At the time $T_3$ in response to the clock pulse of the waveform 155, negative driving pulses are applied to both of the conductors 10 and 12 to develop magnetic propagating fields in the segments thereof as indicated by the field arrows 262. Simultaneously, a −10 volt potential is applied to the selection lead 121 and for recording a binary "one," a negative pulse of the waveform 151 is applied to the base of the amplifying transistor 144 so that a current pulse is passed through the recording coil 108. As a result, a binary "one" of an arrow 264 is established in the wire 74 adjacent to the segments 26 and 44. A shortened arrow 240*a* is to the right of the arrow 264. At the same time, the domains designated by the arrows 236 and 133, that is, the domain walls at the head and tail ends of the arrow 133 are propagated the width of one segment forward. It is to be noted that because the reference domain of the arrow 236 is continuously being formed, it expands in length and only the domain at the tail end thereof is moved, that is, until a "one" is again recorded in the wire 70. At time $T_3$ the single magnetic domain of the arrow 238 along the length of the wire 74 is substantially unaffected.

At time $T_4$ in response to a clock pulse of the waveform 155, positive and negative driving pulses are applied to respective conductors 10 and 12 to form magnetic fields in the segments thereof indicated by the field arrows 266. Also at time $T_4$, a −10 volt potential is applied to the selected lead 123 and a negative pulse of the waveform 151 is applied to the base of the amplifier transistor 144 for recording a binary "one." As a result, current flows through the recording coil 110 and a magnetic domain in the binary "one" state of an arrow 268 is established in the wire 76 adjacent to the segments 44 and 28. Thus, magnetic domain walls are established to the left of the segment 44 adjacent to the tail of the arrow 242 and to the right of the segment 28 adjacent to the shortened arrow 242*a*. At the same time, in response to the propagating field, the reference and binary "one" domains of the arrows 236 and 133 are propagated one segment width forward so that the domain wall at the head of the arrow 133 is to the right of the segment 28. Because a "zero" is stored in the wire 72, a domain wall is not present for being propagated forward. In the wire 74, the binary "one" domain of the arrows 264 is propagated one segment width forward so that the domain wall appears at the right hand side of the segment 28. Thus it can be seen that all recorded magnetic domains once formed, are propagated along the magnetic wires in similar coincident positions.

At time $T_1'$, magnetic propagating fields of field arrows 270 are established similar to the field arrows 248. Also, the selection lead 118 is energized in response to the binary counter 145. If a binary "one" is to be recorded in the wire 70, a negative pulse of the waveform 151 is applied to the base of the amplifier transistor 144 and a magnetic domain of an arrow 272 (shown above the wire 70) is established adjacent to the segments 24 and 42. As shown by the arrows positioned above the wire 70, the reference domain of an arrow 236*b* is thus established between the binary "one" domains 133 and 272 and a new reference domain 276 is established by the reference coil 86. If a binary "zero" were recorded at time $T_1'$, the reference arrow 236*b* would have been continuous to the left of the arrow 133 and a part of the same domain as that of the arrow 276. Simultaneously, each of the arrows 264 and 268 are propagated one conductor segment forward to the right of the segment 45 as is shown by the arrows positioned adjacent to the corresponding wires 72, 74 and 76. This recording operation continues in a similar manner, alternately recording an informational domain and a reference domain with domain walls only established when a binary "one" is being recorded. It is to be noted that either a "zero" or a "one" may be recorded in the corresponding wires during each time period, and the recorded binary pattern is only given as an example.

For explaining the read operation it will be assumed that the recorded domains have been propagated along the corresponding magnetic wires to the positions shown to the right of the broken portion of the propagating array so that the domains of the arrows 133, 264 and 268 have a domain wall at the right of the segment 50. Because a "zero" was recorded at the corresponding time $T_2$ in the wire 72, an arrow 238*a* is a continuation of the magnetized state of the wire 72 between the segments 50 and 36. For clarity of explanation, it will be assumed that in addition to the "one" domain of the arrow 272 being recorded at time $T_1'$, a "one," "one" and "zero" are recorded in the respective wires 72, 74 and 76 at the subsequent time periods as shown by the arrows positioned over the segment 46. At a time $T_n$, in response to the clock pulse of the waveform 155, the magnetic fields such as indicated by the field arrows 248 propagate the magnetic domain walls one segment width forward or over the segment 36. Shortly after time $T_n$, a negative strobe pulse of a waveform 276 is applied to the output amplifier 130. As the domain wall at the head of the arrow 133 moves adjacent to the read coil 120 a sensed signal of a waveform 278 is applied to the output amplifier 130 indicating the presence of a stored "one." In response to the strobe pulse of the waveform 276 a signal (not shown) representative of the interrogated "one" is applied to the lead 134. It is to be noted that also at time $T_n$, the magnetic domains in the wires 72, 74 and 76 are propagated the width of one conductor segment forward.

At time $T_{n+1}$ in response to the propagating fields of the field arrows 258 all of the magnetic domains are propagated over the segment 52 and, because a "zero" is recorded thereat in the wire 72, that is, a domain wall is not positioned thereat, a signal is not induced in the read coil 122. Thus, as shown by the absence of a signal of the waveform 278 after time $T_{n+1}$, a "zero" is interrogated and in response to the strobe pulse of the waveform 276 a low level signal, for example, representing a "zero" is applied to the output lead 134. A dotted pulse of the waveform 278 is shown shortly after time $T_{n+1}$ to indicate the signal if a "one" were stored at the corresponding position in the wire 72.

At a time $T_{n+2}$, the propagating fields established in the conductors 10 and 12 which may be similar to the field arrows 262 move the magnetic domain walls through or over the position of the segment 38 and the domain wall at the head of the arrow 264 induces a signal in the read coil 124 as shown by a pulse 282 of the waveform 278. Because the domain wall at the tail of the arrow 133 passes the read coil 120 at the time $T_{n+2}$, to induce a negative signal in the read coil 120 as indicated by a pulse 278, the interrogated "one" signal sensed by the read coil 124 would have occurred at substantially the same as the pulse 278 and would have been cancelled if all of the read coils had the same relative position along the wdith of the corresponding conductor segments. In order to prevent this cancellation, the read coils 120 and 122 may be positioned substantially near the left hand side of the segments 36 and 52 and the read coils 124 and 126 may be positioned substantially at the right hand side of the segments 38 and 54. Thus it may be seen that the binary "one" pulse 282 occurs subsequently to the pulse 278 and is sampled only in response to a delayed strobe pulse of a waveform 284. The strobe time is determined by the delay time of the delay line 228 and is selected by proper considerations of the propagating speed of the magnetic domains and the width of the segments of the propagating conductors.

At time $T_{n+3}$, the magnetic propagating fields of the field arrows 266 are established to cause the domain of the arrow 268 to move over the segment 54, and a binary "one" shown by the pulse 277 of the waveform 278 is applied to the output amplifier 130 and strobed by the delayed strobe pulse of the waveform 284. It is to be noted that if a binary "one" has been recorded in the corresponding position of the wire 72, that is, at time $T_4$, a negative pulse 288 shown dotted on the waveform 278 would have been sensed to cancel the interrogated "one," being sensed substantially at the same time except for the selected positioning of the read coil 126 and the strobing operation. This operation continues in a similar manner with the binary "one" domain of the arrow 272 recorded in the wire 70 at time $T_1'$ being interrogated shortly after a time $T_{n+4}$. The writing and reading operation is continuous in the manner previously described, and as shown by the waveform 151, a "1," "0," "0," "1" and "0" pattern, for example, may be recorded at times $T_n$ through $T_{n+4}$. It is to be noted that in accordance with the invention, the reading coils may be positioned so that the sequential reading operation is in any desired phase relation of the four driving sequences relative to the driving sequence of recording the information. Also, it is to be noted that the offset arrangement of the read coils may be utilized in accordance with the principles of the invention when longer delays are necessary than those for discrimination among pulses in a single time period, such as for logical purposes.

Thus in accordance with the principles of this invention, information is recorded alternately in different ones of four storage wires, propagated along the storage wires in correspondingly similar positions and read sequentially from different ones of the storage wires by staggering or offsetting the positions of the read coils. As a result, four binary bits of information may be both recorded and read during every time period of the polyphase driving signals. In the system of the invention binary characters or words are stored with their correspondingly adjacent bits in a repetitive sequence of differently accessed storage wires, with the propagating fields being continuously applied to all of the storage wires.

Although, in the arrangement shown in FIG. 1, the read coils were appropriately positioned along each corresponding adjacent conductor segment so that domain walls passing therethrough develop signals in proper phase relation for preventing undesired cancellation, separate output amplifiers or any desired combination of output amplifiers may be utilized for the read coils 120 and 122 and for the read coils 124 and 126 to allow the coils to be positioned at the same relative location of the correspondingly adjacent conductor segments. Also in accordance with the invention, additional read amplifiers may be utilized.

The propagating speeds of the magnetic domain walls in practical systems ranges from 50,000 to 100,000 centimeters per second, for example. Operation may be performed at both higher and lower speeds but the above range may be most desirable for simplicity of manufacturing tolerances and driving current control. The strobe times of the waveform 284 may be determined by considerations of the width of the conductor segments and the propagating speed which is a substantially linear function of the amplitudes of the driving pulses and the intensity of the propagating fields. The width of the conductor segments is selected so that the magnetic domains which are two segments in width are of sufficient length to be stable and may be between ¼ and ½ inch long. It has been found that the magnetic retentivity of a very short magnetic domain is insufficient to support the magnetic state when included in two adjacent domains of opposite magnetic polarity such as a "one" positioned between two reference domains.

Also in accordance with the principles of the invention, the conductors such as 38 and 54 may be widened and arranged so as to apply a larger current therethrough to allow increased discrimination of the pulses as determined by position of the read coils such as 124 and 126. This arrangement may be advantageous when the conductor segments of the array are relatively narrow. Because propagating speed is substantially proportional to driving current, the domain walls would propagate through the width of the widened conductors substantially in the same time period as domain walls propagate through the narrow conductors in the array.

Thus there has been described a relatively simple magnetic shift register system that operates at a relatively high speed by utilizing four channels having recording and reading coils properly staggered or offset so that information is sequentially recorded and sequentially read in different channels. Both the recording coils and the reading coils are arranged so that each is adjacent to different ones of the segments of the propagating conductors. The system operates at four times the speed of a shift register system having a single storage wire operating at the same propagating speeds along the storage wire with the same minimum domain lengths. If desired, the system in accordance with the invention, may utilize a common input amplifier and a common output amplifier by properly positioning the read coils.

What is claimed is:

1. A magnetic storage system comprising a plurality of magnetic mediums adapted to have first and second ends,
   means magnetically coupled to said mediums for applying propagating fields thereto,
   means magnetically coupled to and wound about said first end of said mediums for sequentially recording information in different ones of said plurality of mediums,
   and means magnetically coupled to and wound about said second end of said mediums for responding to the recorded information in the sequence of recording.

2. A magnetic shift register system for storing a sequence of binary bits comprising
   a plurality of individual elongated magnetic mediums adapted to have first and second ends,
   means magnetically coupled to said mediums for applying magnetic propagating fields thereto,
   means magnetically coupled to and wound around said first end of said mediums for sequentially recording a different one of the sequence of binary bits in each of said plurality of mediums,
   and means magnetically coupled to and wound around said second end of said plurality of mediums for responding to the recorded information in the sequence of recording.

3. A shift register storage system comprising
   a plurality of individual elongated juxtaposed magnetic mediums having first and second ends and having characteristics for storing magnetic domains,
   a plurality of propagating conductors positioned adjacent to said plurality of magnetic mediums,
   means coupled to said plurality of propagating conductors for applying pulses thereto for sequentially moving magnetic domains along said plurality of magnetic mediums,
   means coupled to and wound about said first ends of said mediums for sequentially establishing magnetic domains of selected polarities in different ones of a predetermined sequence of said magnetic mediums,
   and means coupled to and wound about said second ends of said mediums for sensing the magnetic domains in different ones of said magnetic mediums in said sequence.

4. A shift register storage system comprising
   a plurality of magnetic mediums,
   means positioned adjacent to said plurality of mediums for sequentially applying magnetic propagating fields thereto, means coupled to each of said plurality of mediums at first ends thereof for sequentially establishing magnetic domains in different ones of said mediums in a predetermined order thereof so that said domains are propagated therealong in a common position relative to said means for applying magnetic propagating fields, and means coupled in common to said mediums at second ends thereof for sensing the magnetic domains in the sequence of establishment.

5. A shift register storage system comprising a plurality of magnetic mediums, a propagating conductor array having a plurality of conductor segments positioned adjacent to said plurality of mediums for applying selected sequences of magnetic propagating fields thereto during a plurality of time periods, a plurality of recording conductors each magnetically coupled to a different one of said mediums adjacent to a different segment of said conductor array for sequentially establishing magnetic domains in different ones of said mediums in a predetermined order such that said domains are propagated therealong in a common position relative to said propagating conductor array, a source of record pulses coupled to said recording conductors for recording information in a different one of said mediums during each time period, and a plurality of reproducing conductors each magnetically coupled to a different one of said mediums adjacent to a different segment of said conductor array for sequentially responding to the recorded information.

6. A shift register system comprising a plurality of magnetic wires each having a magnetic orientation along the longitudinal axis thereof, a propagating conductor array having a plurality of conductor segments positioned adjacent to said wires for applying magnetic propagating fields thereto, a plurality of reference coils each magnetically coupled to a different one of said wires in a position adjacent to a different one of said conductor segments for establishing reference magnetic domains in the respective magnetic wires to which said reference coils are magnetically coupled, a plurality of recording coils each magnetically coupled to a different one of said wires in a position adjacent to a different one of said conductor segments for sequentially establishing informational magnetic domains in the respective magnetic wires to which said recording coils are coupled said informational magnetic domains being established in a predetermined order such that said magnetic domains are propagated along said magnetic wires in a common position relative to said conductor segments, a source of recording pulses coupled to said plurality of recording coils for recording information in a predetermined sequence in different ones of said wires, and a plurality of reading coils each coupled to a different wire in a position adjacent to a different conductor segment for sensing the recorded magnetic information from the different wires in said predetermined sequence.

7. A magnetic shift register system comprising a plurality of wires arranged in parallel and in a sequential order, said wires being of a magnetic material magnetically oriented substantially along the longitudinal axes thereof, said wires having first and second ends, a propagating conductor array having a plurality of segments positioned substantially at right angles to said wires, a source of propagating pulses coupled to said propagating conductor array for developing sequences of magnetic fields progressing the width of one segment toward said second end during each of a plurality of time intervals.

a plurality of first coils each magnetically coupled to different ones of said wires substantially at the first ends thereof, each having a different position offset the width of one conductor segment toward said second ends at corresponding wires of said sequential order, a plurality of second coils each magnetically coupled to different ones of said wires substantially at the first ends thereof, each having a different position offset the width of one conductor segment toward said second ends at corresponding wires of said sequential order, a plurality of third coils each magnetically coupled to different ones of said wires substantially at the second ends thereof, each having a different position offset the width of one conductor segment toward said second ends at corresponding wires of said sequential order, a source of current coupled to said first coils for establishing reference domains in said wires, a source of informational pulses coupled to said second coils for sequentially establishing informational domains in said sequence of wires, and output means coupled to said third coils for responding to informational domains in the different wires in the same sequence as established by said source of informational pulses.

8. A magnetic shift register system comprising first, second, third and fourth wires arranged in parallel in a sequence and of a magnetic material being magnetically oriented substantially along the longitudinal axes thereof, said wires having first and second ends, a propagating conductor array having a plurality of segments positioned substantially at right angles to said wires, a source of propagating pulses coupled to said propagating conductor array for developing during four repetitive time periods, sequences of magnetic fields sequentially progressing the width of one segment toward said second end during each time period, first, second, third and fourth reference coils magnetically coupled to respective ones of said first, second, third and fourth wires substantially at the first ends thereof and respectively having different positions offset toward said second ends the width of one conductor segment, first, second, third and fourth record coils each magnetically coupled to respective ones of said first, second, third and fourth wires substantially at the first ends thereof and respectively having different positions offset toward said second ends the width of one conductor segment, first, second, third and fourth read coils each magnetically coupled to respective ones of said first, second, third and fourth wires substantially at the second end thereof and respectively having different positions offset toward said second ends the width of one conductor segment, a source of current coupled to said reference coils for establishing reference domains in said wires, a source of informational pulses coupled to said record coils for sequentially establishing informational domains in said sequence of wires, and output means coupled to said read coils for responding to informational domains in the different wires in the same sequence as established by said source of informational pulses.

9. A shift register system comprising a plurality of magnetic mediums arranged in parallel in a sequence and having first and second ends, a propagating conductor array having substantially parallel segments positioned adjacent to said plurality of magnetic mediums, means coupled to the first ends of said mediums for establishing magnetic informational domains in said sequence of mediums, said domains having a minimum length substantially equal to the width of a predetermined number of conductor segments, and a plurality of sense conductors arranged in first and second groups each group including sense conductors equal to said predetermined number, each conductor magnetically coupled to different ones of said mediums and correspondingly adjacent to sequential ones of said elements, with the conductors in said first group having a different position relative to the corresponding segments than the conductors of said second group.

10. A shift register system comprising a plurality of magnetic mediums having longitudinal axes arranged in parallel in a sequence and having first and second ends, a propagating conductor array having substantially parallel segments positioned adjacent to said plurality of mediums for applying propagating fields along the axes thereof, means for establishing series of magnetic informational domains in each medium substantially at the first ends thereof for being propagated toward said second ends, and a plurality of read conductors each magnetically coupled to a different one of said mediums adjacent in said sequence of mediums to a sequence of different adjacent segments, said read conductors, forming first and second groups, the read conductors of said first group having a different relative position along the width of corresponding segments than the read conductors of said second group so as to distinguish between opposite ends of said informational domains of each of said series.

11. A shift register system comprising first, second, third and fourth magnetic mediums arranged in parallel and in a sequence, said mediums having first and second ends, a propagating conductor array having a plurality of parallel conductor segments coupled to said mediums for applying four repetitive sequences of magnetic propagating fields thereto, said segments each having a width between edges thereof, recording means having conductors coupled to said mediums substantially at the first ends thereof for sequentially establishing combinations of magnetic informational domains and reference domains, each combination having similar positions relative to said segments, said domains having a minimum length substantially equal to the width of two segments, first, second, third and fourth read coils magnetically coupled to the respective first, second third and fourth mediums adjacent to different segments respectively progressing toward said second ends, said first and second read coils and said third and fourth read coils respectively having positions along the width of the corresponding segments substantially near the edges thereof toward the first ends and toward the second ends of said wires.

References Cited

UNITED STATES PATENTS

| | | | |
|---|---|---|---|
| 2,517,808 | 8/1950 | Sziklai ---------- | 179—100.2 X |
| 3,068,453 | 12/1962 | Broadbent ---------- | 340—174 |

STANLEY M. URYNOWICZ, Jr., *Primary Examiner.*